United States Patent [19]
Layton

[11] Patent Number: 5,218,418
[45] Date of Patent: Jun. 8, 1993

[54] DIFFERENTIAL FIBER OPTIC SENSOR AND METHOD

[76] Inventor: Michael R. Layton, 1849 Yolanda Cir., Clayton, Calif. 94517

[21] Appl. No.: 785,589

[22] Filed: Oct. 30, 1991

[51] Int. Cl.$^5$ ............................................. G01B 9/02
[52] U.S. Cl. ................... 356/345; 250/227.27
[58] Field of Search .................. 356/345, 350, 358; 372/29; 250/227.27, 227.19

[56] References Cited

U.S. PATENT DOCUMENTS 4,552,457 11/1985 Giallorenzi et al. ................ 356/345
4,989,979 2/1991 Buckman .................... 250/227.27

OTHER PUBLICATIONS

A. Dandridge and A. B. Tveten, Appl. Phys. Lett. vol. 39, No. 7, Oct. 1981, p. 530.
K. Petermann and E. Weidel, IEEE Journal of Quantum Electronics, vol. QE-17, No. 7, Jul. 1981, pp. 1251-1256.
A. Dandridge, Journal of Lightwave Technology, vol. LT-1, No. 3, Sep. 1983, pp. 514-518.
G. F. McDearmon, Journal of Lightwave Technology, vol. LT-5, No. 5, May 1987, pp. 647-652.
A. Dandridge, A. B. Tveten, A. D. Kersey and A. M. Yurek, Journal of Lightwave Technology, vol. LT-5, No. 7, Jul. 1987, pp. 947-952.
A. Dandridge, A. B. Tveten and T. G. Giallorenzi, IEEE Journal of Quantum Electronics, vol. QE-18, No. 10, Oct. 1982, pp. 1647-1653.
J. H. Cole, B. A. Danver and J. A. Bucaro, IEEE Journal of Quantum Electronics, vol. QE-18, No. 4, Apr. 1982, pp. 694-697.

Primary Examiner—Samuel A. Turner

[57] ABSTRACT

Two substantially identical optical fiber interferometers, preferably packaged together and exposed to the same parameter to be measured, wherein an increase of the field quantity to be measured causes an increase of the delay time difference of one interferometer and a decrease of the delay time difference of the other interferometer. Demodulator means is connected to the outputs of the interferometers to demodulate the phase-modulated signals from each of the interferometers, and electronic differencing means is connected to receive the demodulated signals from the demodulator means to difference one of the signals from the other to enhance the measured signals relative to the laser-induced noise signals.

16 Claims, 1 Drawing Sheet

DIFFERENTIAL FIBER OPTIC SENSOR AND METHOD

BACKGROUND OF THE INVENTION

This invention pertains to noise reduction in fiber optic interferometric systems used for sensing. More particularly, it pertains to such noise reduction in hydrophone sensor systems employing pairs of Michelson or Mach-Zehnder interferometers at each spatial sensing point. The apparatus and methods apply as well to measurement of field quantities such as sound, pressure and temperature.

Both Michelson and Mach-Zehnder interferometers are used to measure acoustic pressure and temperature. Sound is measured by detecting the instantaneous fluid pressure. The arms of the interferometer are immersed in the fluid whose pressure, temperature, or other parameter is to be measured. The measured parameter will be recited herein as either pressure or acoustic pressure with the understanding that the invention is not limited to pressure or acoustic pressure.

Usually one arm of the interferometer is sensitized to changes in fluid pressure, whereas the other is not. Alternatively, one arm may extend and the other contract with increases in pressure. Frequently, to reduce noise, the output signal of an identical interferometer, whose arms are not exposed to the sensed pressure, is subtracted from the sensor interferometer output signal.

It is found that, because the coherence length of the driving laser is finite, phase errors or phase noise are produced in the output signal.

In the prior art, both Mach-Zehnder and Michelson interferometric sensors have only one input port and one output port. Single-mode directional couplers are used to split and recombine the light beams. In a typical operation, one of the fiber arms is sensitive to the field quantity to be measured, and the other arm is isolated. A change in pressure at the sensor causes a differential change in phase between the two recombined beams, producing an intensity change at the detector.

In a frequency-division-multiplexed system, FM-modulated coherent light, combined with a small delay-time imbalance between the interferometer fiber paths produces a phase-modulated carrier at the detector, simplifying signal demodulation. Intensity noise is also generated by the combination of laser phase noise and the delay time imbalance. Both the desired sensor signal and the laser phase-noise appear in the sensor output signal. Prior-art interferometric sensors employing FM-modulated sources and slightly-unbalanced paths are limited in performance by the phase-noise of the laser.

In other prior art embodiments, both available output signals from Mach-Zehnder interferometric sensors are used. Changes in the intensity of such sensor signals are differential. The phases of the sensed signals and the phase of the laser noises are not common-mode. Differencing the two output signals increases the signal-to-noise ratio 3dB, for the carrier power increases 6dB, but the noise increases only 3 dB.

Single-output Frequency-Division-Multiplexed (FDM) interferometric sensors are limited by phase noise from the combined effect of finite laser linewidth and the slight delay-time imbalance in the sensor.

One prior art apparatus that purports to eliminate or reduce laser phase noise uses a remote isolated interferometer whose delay-time difference is matched to that of the sensor. Following photodetection and demodulation, the signals from the isolated interferometer and from the sensor interferometer are electronically differenced, cancelling phase noise. The sensed signal is unchanged because the remote isolated reference interferometer is not exposed to the physical stimulus which is sensed by the sensors. Only one reference interferometer is needed for a plurality of sensors, all driven by a common laser source. The demodulated electrical output signals from the reference interferometer contains only laser phase noise. That output is subtracted from the outputs of all of the sensor channels, cancelling the laser phase noise while preserving the desired signal.

Such apparatus has achieved limited success in the laboratory, but it is believed to have limited potential in the field. Separate mechanical packages are needed for the sensor and the reference, and the reference must be well-isolated from the environment. Second order non-linear terms are not eliminated. Noise is also produced by the telemetry connecting the laser to the sensor. Further, failure to accurately match the delay-time difference between any sensor and the reference interferometer reduces noise cancellation. The matching condition is often difficult to maintain over widely-varying environmental conditions.

BRIEF DESCRIPTION OF THE INVENTION

The apparatus of the invention reduces or eliminates phase noise in the output signal of the interferometric sensors.

The interferometer system of the invention uses two substantially identical interferometers, and both interferometers are packaged and positioned, preferably, as close together as possible, where the parameter is to be measured. The interferometers are either Michelson interferometers wherein the optical signals are reflected back through the interferometer arms or Mach-Zehnder interferometers wherein the optical signals are re-combined at the output on the far ends of the interferometers. A physically-separated and isolated reference interferometer is not required. Second order non-linear effects are eliminated by the apparatus and method of the invention.

The phase noise signals produced by each of the two interferometers are of the same polarity (sense), whereas the desired signal terms are of opposite polarity. Differencing the outputs electronically thereby provides a significant improvement in signal-to-laser-phase-noise.

Detection thresholds of one microradian or better (1 Hz bandwidth) using an ordinary laser diode have been anticipated from prior art fiber optic sensors, but have heretofore not been achieved. The method and apparatus described herein eliminate the major obstacle to achieving such noise performance.

The differential sensor of this invention is particularly attractive for towed hydrophone arrays. A significant improvement in detection threshold is anticipated, without the need for high scale factor sensors. The sensor package can therefore be designed to be less compliant and mechanically stronger.

It is therefore an object of the invention to reduce or eliminate laser phase induced error signals in a fiber optic sensing system.

It is also an object of the invention to provide an improved, lower noise, hydrophone system.

It is a more particular object of the invention to achieve the above object using two sensing interferometers, connected such that the produced noise signals are in phase, whereas the desired sensor signals are out-of-phase. Processing by electronically differencing the signals cancels the noise term whereas the signal term doubles.

Other objects will become apparent from the following description, taken together with the accompanying drawings.

DETAILED DESCRIPTION OF THE PREFERRED EMBODIMENT

Figure 1:
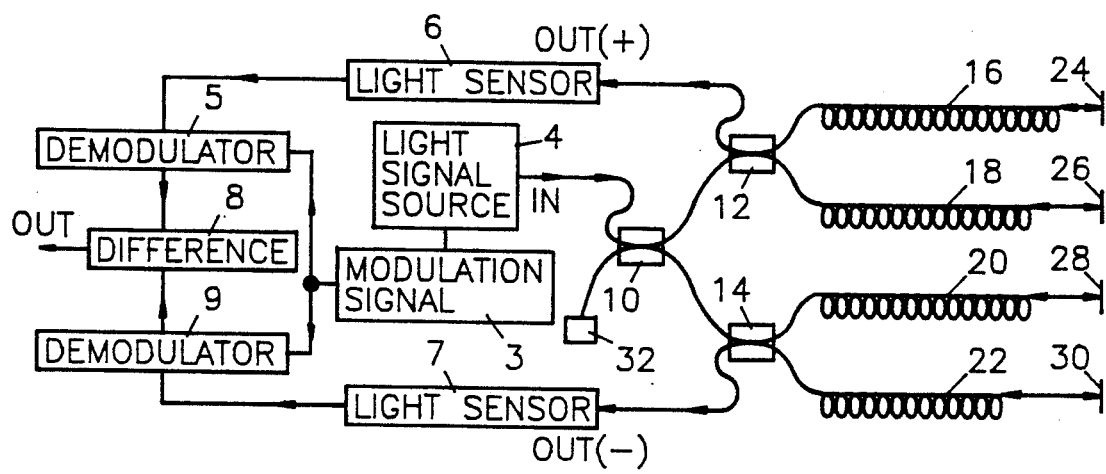
FIG. 1 is a drawing of the invention using Michelson interferometers.

FIG. 1 shows an embodiment of the invention using Michelson interferometers.

A laser light source 4 of frequency modulated light signals delivers light signals $v(t)$ to the interferomer arms 16, 18, 20, and 22.

$$v(t) = v_p + \Delta v \sin \omega_c t \quad (1)$$

$v_p$ is the optical carrier frequency ($10^{14}$ Hz.), $\Delta v$ is the peak frequency deviation (typically about 1 GHz.), $\omega_c$ is the modulation carrier frequency, typically between 10 KHz and 1 MHz.

The signal is delivered via telemetry fiber to an optical coupler 10 which splits the signal into equal parts on a power basis, sending part of the signal through an optical fiber to coupler 12 and part through an optical fiber to coupler 14.

The optical fiber arms of the Michelson interferometers each comprise coils 16, 18, 20, and 22 of optical fiber terminated in mirrors 24, 26, 28, and 30 which reflect incident optical signals back through their respective interferometer arms.

The arms 18 and 20 are packaged so as to be insensitive to changes in the measured parameter and will be called, "reference arms." The arms 16 and 22 are sensitized to changes in the measured parameter. They are typically arms of a fiber optic hydrophone sensor, and they will be called, "sensor arms.".

The coupler 12, referred to as the positive (+) sense interferometer coupler, splits the incoming optical signal into two nominally equal parts. It directs substantially one half of the light to optical fiber arm 16 and the other half to optical fiber arm 18 of a first Michelson interferometer. One of the fiber lengths 16 is adjusted such that the round trip delay for light propagating from the coupling region of coupler 12 out to the mirror 24 and back is $$\tau_s = \tau_{92} + \tau \quad (2)$$

where $\tau_s$ is the round-trip time of travel through arm 16 to mirror 24 and back to coupler 12, $\tau_p$ is the round-trip time of travel through arm 18 to mirror 26 and back to coupler 12, and $\tau$ is the time delay between the two signals in the two arms in the absence of a sensed signal. The fibers 16 and 18 are configured such that the differential round trip delay $\tau$, increases for an increase in the sensed field. For example, in a hydrophone which senses acoustic pressure, the delay of the sense fiber 16 increases for an increase of acoustic pressure.

The coupler 14, referred to as the negative (−) sense interferometer coupler, splits the incoming optical signal into two nominally equal parts. It sends part of the signal to optical fiber arm 20 and part to optical fiber arm 22 of a second Michelson interferometer.

One of the fiber lengths 22 is adjusted such that the round trip delay for light propagating from the coupling region of coupler 14 out to the mirror 30 and back is $$\tau_s = \tau_p - \tau \quad (4)$$

where $\tau_s$ is the round-trip time of travel through arm 22 to mirror 30 and back to coupler 14, $\tau_p$ is the round-trip time of travel through arm 20 to mirror 28 and back to coupler 14, and $\tau$ is the differential time delay between the two signals in the two arms in the absence of a sensed signal. The fibers 20 and 22 are configured so that the differential round trip delay, $\tau$, decreases for an increase in the sensed field. For example, for a hydrophone which senses acoustic pressure, the delay of the sense fiber 22 increases for an increase of sensed pressure.

The reference arms 18 and 20 are adjusted such that the round-trip delay for light propagating from coupler 12 to the mirror 26 and back, and from coupler 14 to the mirror 28 and back is $$\tau_R = \tau_p \quad (3)$$

The reflected signals are compared in the couplers 12 and 14. Because of the extension and contraction of the measuring arms 16 and 22, the phase of the output light signal from coupler 12, in response to such extension and contraction is changed in one direction (say advanced) in the first interferometer, and it is changed in the other direction (say retarded) in the other interferometer.

Each Michelson interferometer measures differential delay time between its sense and reference light paths. For the (+) interferometer of arms 16, 18, the delay time difference increases with increasing acoustic pressure. The output signal is therefore of a (+) polarity. For the (−) interferometer of arms 20 and 22, the delay time difference decreases with increasing acoustic pressure, and the output signal is therefore of a (−) polarity.

Preferably, the two output signals are sensed by the optical detectors 6 and 7, respectively. The electrical signals from detectors 6 and 7 are differenced in a demodulated by demodulators 5 and 9 respectively. The outputs of demodulations 5 and 9 are differencer 8 to produce a signal enhanced, noise reduced output for the interferometer system of the invention.

$$i(t) = I_p \cos(B \sin \omega_c t + s(t) = n(t) + \phi) \quad (5)$$

where
$B = 2\pi(\Delta v)\tau_s$
$s(t) =$ measured acoustic signal
$n(t) =$ laser phase noise
$\phi =$ static phase difference In equation (5), s(t) is the desired signal which is directly proportional to the dynamic acoustic pressure, n(t) is noise due to the combined effects of finite laser linewidth and the delay-time difference $\tau$ and $\phi$ is the static phase difference between the interfering beams.

After demodulation in a sine-cosine type demodulator 5, the output signal is $$v_{30}(t) = K_1(s(t) + n(t)) \tag{6}$$

After demodulation in demodulator 9, the output signal is $$v_-(t) = K_1(-s(t) + n(t)) \tag{7}$$

where $K_1$ is the scale factor (volts/radian) of the demodulator.

Taking the difference between equations (6) and (7), $$v_o(t) = 2K_1 s(t). \tag{8}$$

The n(t) term vanishes!

Figure 2:
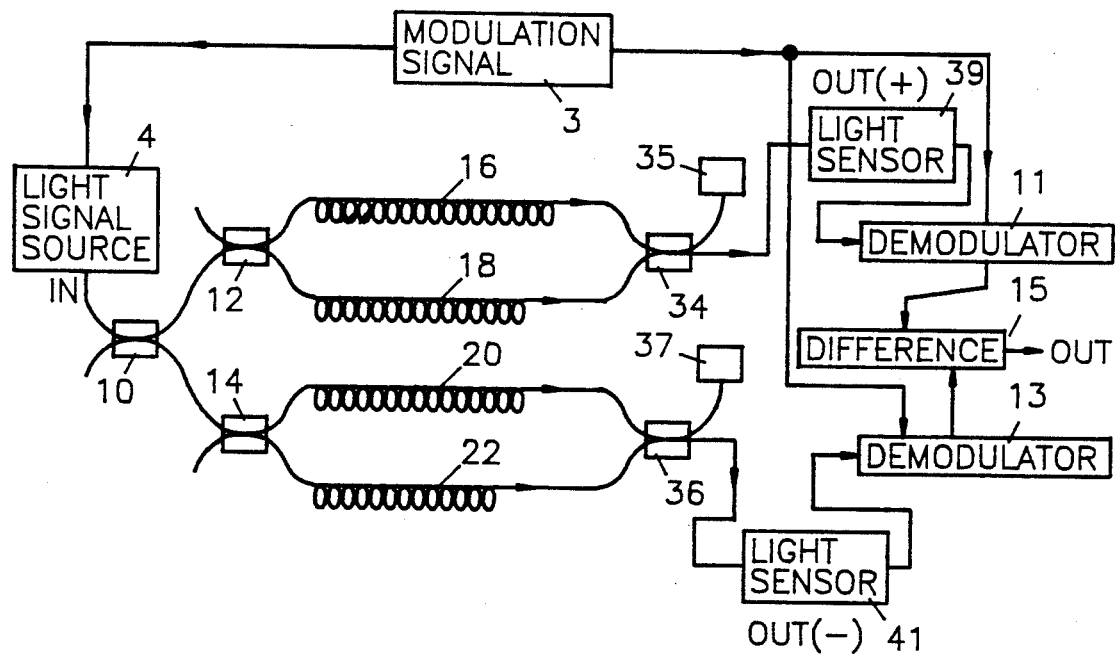
FIG. 2 is a drawing of the invention using Mach-Zehnder interferometers.

An embodiment using Mach-Zehnder interferometers is shown in FIG. 2. The light signals are sent to the interferometer arms in the same fashion as shown and described above for the Michelson interferometers. However, the Mach-Zehnder interferometers, 16, 18, 20, and 22, are not terminated in mirrors, but deliver their signals into couplers 34 and 36. The phase retarded and phase advanced signals at the outputs of the couplers 34 and 36 are preferably each sensed by a different optical detector 39 and 41, and the sensor output is then electronically demodulated in demodulators 11 and 13 and differenced in differencer 15 to produce an output signal as shown in the embodiment of FIG. 2.

In operation of the apparatus of FIG. 1, the interferometer output signals from couplers 12, 14 of the two Michelson interferometers are delivered to light sensors 6, 7 which produce electrical signals which are phase modulated. The two signals are demodulated in demodulators 5 and 9. The demodulator signals are differenced in the differencer 8, and the difference signal from the differencer 8 is a measure of the physical parameter sensed by the interferometer. The noise signals cancel, and the desired signals add, in the difference apparatus 8.

The signal sinks 32, 35, and 36 are included to terminate the free ends of the fibers in the couplers 10, 34 and 37, thereby to eliminate spurious signal reflections.

In operation of the apparatus of FIG. 2, the output signals from the Mach-Zehnder interferometers 16, 18 and 20, 22 appear at the output of the couplers 34 and 36. They are photodetected by the sensors 39 and 41, demodulated by the demodulators 11 and 13, and electronically differenced in the differencer 15. The output of the differencer 15 is a measure of the sensed physical parameter. The noise signals cancel, and the desired signals are enhanced, in the differencer 15.

Thus, the described and claimed apparatus reduces or eliminates phase noise in interferometers, particularly hydrophone interferometers.

Although the invention is described above, it is not to be limited by the description, but only by the description taken together with the accompanying claims.

I claim:

1. In combination:

a source for providing frequency modulated light signals;

first and second interferometers, each respective interferometer having a corresponding reference arm and a sensor arm, each respective sensor arm being packaged and positioned to be sensitive to changes in a field to be measured and each respective reference arm being packaged to be insensitive to changes in the field to be measured;

means for coupling a first and second portion of said frequency modulated light signals into said first and said second interferometers, each respective interferometer directing substantially one half of said its respective portion of said frequency modulated light signals to its respective reference arm and the remainder of said portion of said frequency modulated light signals into its respective sensor arm;

said frequency modulated light signals entering each reference arm and corresponding sensor arm being delayed by a respective delay time before being combined to form a respective output signal, the difference between the corresponding delay times being a delay time difference;

the reference arm and sensor arm of each respective fiber interferometer being formed to respond to a field quantity to be measured, with an increase of the delay time difference of said first interferometer and a decrease of the delay time difference of said second interferometer;

demodulator means responsive to each respective output signal for demodulating the output signals from each said interferometer to provide a first and a second demodulated output signal; and electronic differencing means responsive to the first and second demodulated output signals for forming the difference between said first demodulated output signal and said second demodulated output signal to provide an enhanced measured output signal with reduced laser-induced phase noise.

2. A method for enhancing interferometer signals and reducing laser-induced phase noise comprising the steps of:

providing a source of frequency modulated light signals to the inputs of a first and a second interferometer, each interferometer having a sensor arm positioned to respond to a field quantity to be measured and a reference arm packaged to be substantially insensitive to said field quantity to be measured, a portion of the frequency modulated signals transitioning each respective sensor arm and reference arm being delayed by a corresponding first and second delay time before being combined to form an a first interferometer output signal and a second interferometer output signal, the difference between the first and second delay times for each respective interferometer being a delay time difference for each interferometer;

producing an increased delay time difference in said first interferometer with an increase in the field quantity to be measured;

producing a decreased delay time difference in said second interferometer with an increase in the field quantity to be measured;

demodulating said first and second interferometer output signals; and differencing said first and second interferometer two output signals to provide an enhanced measured output signal with reduced laser-induced phase noise.

3. Apparatus as recited in claim 1, wherein the sensing arm of said first interferometer is longer than its reference arm, and the sensing arm of said second interferometer is shorter than its reference arm; and differentially coupling the output signals from said first and second interferometers to provide an enhanced measured output signal with reduced laser-induced phase noise.

4. Apparatus as recited in claim 3 in which the arms of said first and second interferometers are hydrophones.

5. Apparatus as recited in claim 4 in which said hydrophones are packaged together with the reference arm of each interferometer being packaged to be insensitive to changes in acoustic pressure.

6. Apparatus as recited in claim 3 in which the sensor arm of said first and second interferometers increase in length with an increase in acoustic pressure.

7. Apparatus as recited in claim 3 in which the sensor arms of said first and second interferometers decrease in length with an increase in acoustic pressure.

8. Apparatus as recited in claim 7 in which said first and second interferometers are Michelson interferometers.

9. Apparatus as recited in claim 7 in which said first and second interferometers are Mach-Zehnder interferometers.

10. In combination:
a source of coherent optical signals;
a source of modulation signals, connected to frequency modulate said coherent optical signals;
first, second and third optical couplers;
said first optical coupler being coupled by a first optical fiber to receive said coherent optical signals, to divide said coherent optical signals into two substantially identical second and third coherent optical signals, and to deliver said second and third coherent optical signals into a second and a third optical fiber, respectively;
said second and third optical couplers being coupled to receive said second and third coherent optical signals from said second and third optical fibers, respectively;
a first interferometer and second interferometer, said first and second interferometers being substantially identical, each respective interferometer having a reference arm and a sensor arm, said reference and sensor arm being positioned together to receive the same parameter to be sensed;
the reference arms of said interferometers being substantially of the same length and insensitive to the parameter to be sensed;
the sensor arm of the first of said interferometers being longer than its reference arm, and the sensor arm of the second interferometer being shorter than its reference arm;
said reference and sensor arms of said first interferometer being coupled to receive coherent optical signals from said second optical coupler;
said reference and sensor arms of said second interferometer being coupled to receive coherent optical signals from said third optical coupler;
the sensing arms of said first and second interferometers being configured to increase in length with an increase in the parameter to be sensed;
first and second sensor means, connected to receive optical output signals from said first and second interferometers, respectively for providing first and second phase demodulated electrical signals;
first and second demodulator means, connected to receive demodulation signals from said source of modulation signals, and connected to receive respective first and second phase demodulated electrical signals from said first and second sensor means, respectively for providing first and second demodulator output signals; and
differencing means for subtracting the first and second demodulator output signals, one from the other, to produce an enhanced interferometer signal having decreased laser phase noise.

11. Apparatus as recited in claim 10 wherein the arms of said interferometers are packaged together.

12. Apparatus as recited in claim 11 wherein said interferometers are hydrophones.

13. Apparatus as recited in claim 11 wherein said interferometers sense acoustic pressure waves.

14. Apparatus as recited in claim 11 wherein said interferometers sense fluid pressure differences.

15. Apparatus as recited in claim 11 wherein said interferometers are Michelson interferometers.

16. Apparatus as recited in claim 11 wherein said interferometers are Mach-Zehnder interferometers.

* * * * *